United States Patent
Kojo

(10) Patent No.: US 7,234,066 B2
(45) Date of Patent: Jun. 19, 2007

(54) SERVER, CLIENT, AND METHOD FOR SHUTTING DOWN POWER OF COMPUTERS ON NETWORK

(75) Inventor: Tomomasa Kojo, Tokyo (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 10/932,568

(22) Filed: Sep. 2, 2004

(65) Prior Publication Data

US 2005/0055589 A1 Mar. 10, 2005

(30) Foreign Application Priority Data

Sep. 4, 2003 (JP) ............................. 2003-312097

(51) Int. Cl.
*G06F 1/00* (2006.01)

(52) U.S. Cl. ...................................... 713/310
(58) Field of Classification Search ................. 713/310
See application file for complete search history.

(56) References Cited

U.S. PATENT DOCUMENTS

| | | | |
|---|---|---|---|
| 5,713,027 A * | 1/1998 | Soejima et al. ............. | 713/300 |
| 5,968,116 A * | 10/1999 | Day et al. .................... | 709/202 |
| 6,304,981 B1 * | 10/2001 | Spears et al. ................. | 714/24 |
| 6,675,198 B1 * | 1/2004 | Hagiwara et al. ........... | 709/208 |

FOREIGN PATENT DOCUMENTS

| | | |
|---|---|---|
| JP | 02-193210 | 7/1990 |
| JP | 03-252714 | 11/1991 |
| JP | 04-068415 | 3/1992 |
| JP | 04-289906 | 10/1992 |
| JP | 04-343115 | 11/1992 |
| JP | 08-115188 | 5/1996 |

* cited by examiner

*Primary Examiner*—Rehana Perveen
*Assistant Examiner*—Eric Chang
(74) *Attorney, Agent, or Firm*—Wolf, Greenfield & Sacks, P.C.

(57) ABSTRACT

When a first computer on a network is subjected to a shutdown operation, the first computer sends a power-off request to other computers on the network. If a second computer that has received this power-off request cannot be powered off, the second computer determines whether or not the power-off request is from a communication partner of the second computer. If the power-off request is not from a communication partner, the second computer remains powered on. If the power-off request is from a communication partner, the second computer returns to the communication partner a response indicating a refusal to accept the power-off request. If the communication partner receives the response indicating a refusal to accept the power-off request, the communication partner remains powered on. A computer that has sent a power-off request is powered off if it does not receive a response indicating a refusal to accept the power-off request.

5 Claims, 10 Drawing Sheets

*7: NOTIFICATION THAT POWER-OFF REQUEST HAS BEEN REFUSED

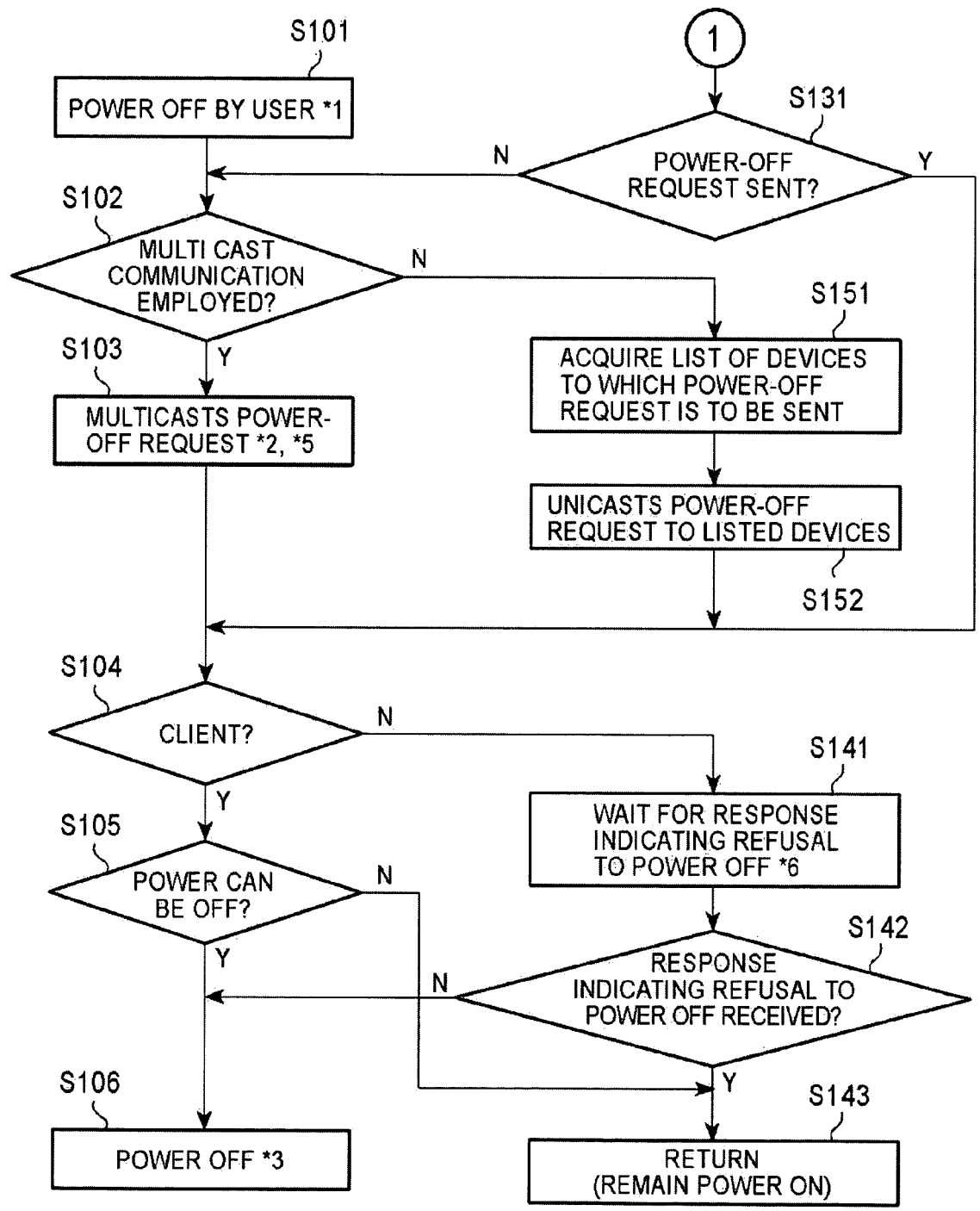

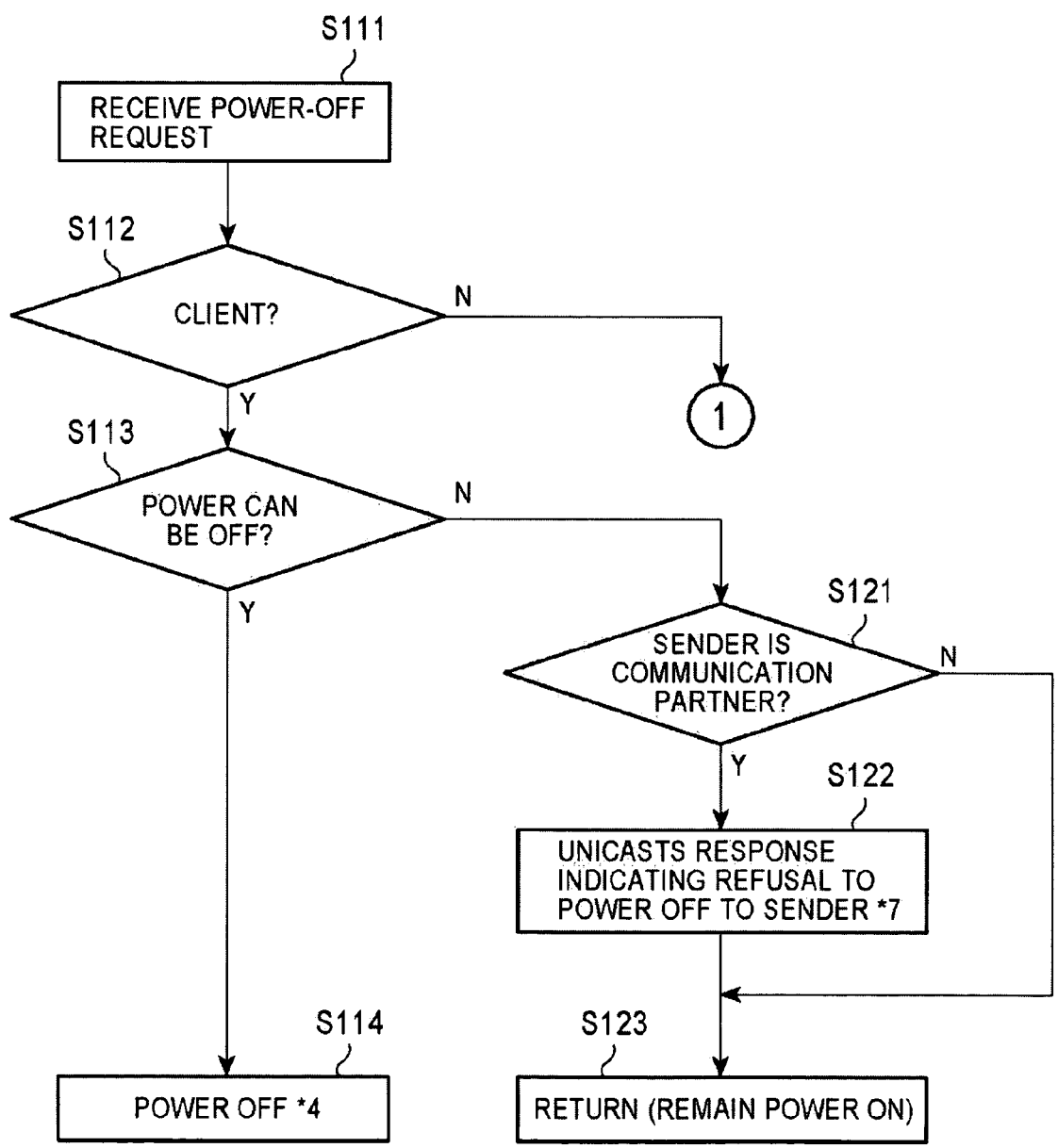

SERVER, CLIENT, AND METHOD FOR SHUTTING DOWN POWER OF COMPUTERS ON NETWORK

BACKGROUND OF THE INVENTION

1. Field of the Invention

The present invention relates to a server, a client, and a method for shutting down the power of computers on a network.

2. Description of the Related Art

A function called Wakeup On LAN (local area network) (hereinafter, referred to as WOL) enables predetermined computers on a network to be powered on in conjunction with the power-on operation of a different computer on the same network. With this WOL function, a server in a power-off state can be powered on according to a command from a client. Thus, the WOL function is widely used particularly in personal computers such as IBM PC/AT-compatible computers.

Furthermore, power on/off of some audio and visual (AV) devices can also be linked with the power on/off operation of another device. For example, a display device can be powered on in conjunction with the power-on operation of a video cassette recorder (VCR), as disclosed in Japanese Unexamined Patent Application Publication No. 2003-69585.

As described above, the WOL function is widely used in the world of personal computers. Unfortunately, a function for turning off the power of a computer in conjunction with the power off operation of another computer has not yet been realized. This is because a personal computer is required to process complicated conditions to determine whether or not the power can be safely turned off when the computer receives an external power-off request. As a result, if this determination is made improperly, unintended shutdown of the personal computer may occur.

SUMMARY OF THE INVENTION

An object of the present invention is to overcome the above-described problem.

According to an aspect of the present invention, a method for shutting down the power of a plurality of computers on a network includes the steps of sending a power-off request from a first computer on the network to other computers on the network when the first computer is subjected to a power-off operation; carrying out processing for shutting down the power of the first computer after the power-off request is sent from the first computer; making a first determination as to whether or not a second computer on the network that has received the power-off request can be powered off; shutting down the power of the second computer if the first determination indicates that the second computer can be powered off or making a second determination as to whether or not a computer that has sent the power-off request to the second computer is a communication partner of the second computer if the first determination indicates that the second computer cannot be powered off; keeping the second computer powered on if the second determination indicates that the computer that has sent the power-off request to the second computer is not a communication partner of the second computer or sending a response indicating a refusal to accept the power-off request from the second computer to the computer that that sent the power-off request to the second computer if the second determination indicates that the computer that has sent the power-off request is a communication partner of the second computer; and keeping the computer that has sent the power-off request powered on if the computer that has sent the power-off request receives a response indicating a refusal to accept the power-off request or shutting down the computer that has sent the power-off request if the computer that has sent the power-off request does not receive a response indicating a refusal to accept the power-off request.

According to another aspect of the present invention, a server of a plurality of computers constituting a network executes the steps of ignoring a first power-off request when the first power-off request is sent to the server from a client on the network subjected to a shutdown operation and sending a second power-off request to another computer on the network; checking whether or not a response indicating a refusal to accept the second power-off request is returned from a client to the server after the second power-off request is sent; and shutting down the server if a check result in the checking step indicates that a response indicating a refusal to accept the second power-off request is not returned to the server or keeping the server powered on if a check result in the checking step indicates that a response indicating a refusal to accept the second power-off request is returned to the server.

According to still another aspect of the invention, a client of a plurality of computers constituting a network executes the steps of determining whether or not the client can be powered off when a power-off request is sent from another client on the network subjected to a shutdown operation; and shutting down the client if a result in the determining step indicates that the client can be powered off or keeping the client powered on and sending a response indicating a refusal to accept the power-off request sent from a server on the network if a result in the determining step indicates that the client cannot be powered off.

According to the present invention, shutting down the power of a computer on a network triggers shutdown of other computers on the same network. In this case, only computers which have completed their jobs are powered off, while computers which are still doing jobs remain powered on. This prevents unintended shutdown of a computer from occurring.

BRIEF DESCRIPTION OF THE DRAWINGS

FIG. 9 is a flowchart showing part of a process according to an embodiment of the present invention; and FIG. 10 is a flowchart continued from the flowchart in FIG. 9.

DESCRIPTION OF THE PREFERRED EMBODIMENTS

Figure 1:
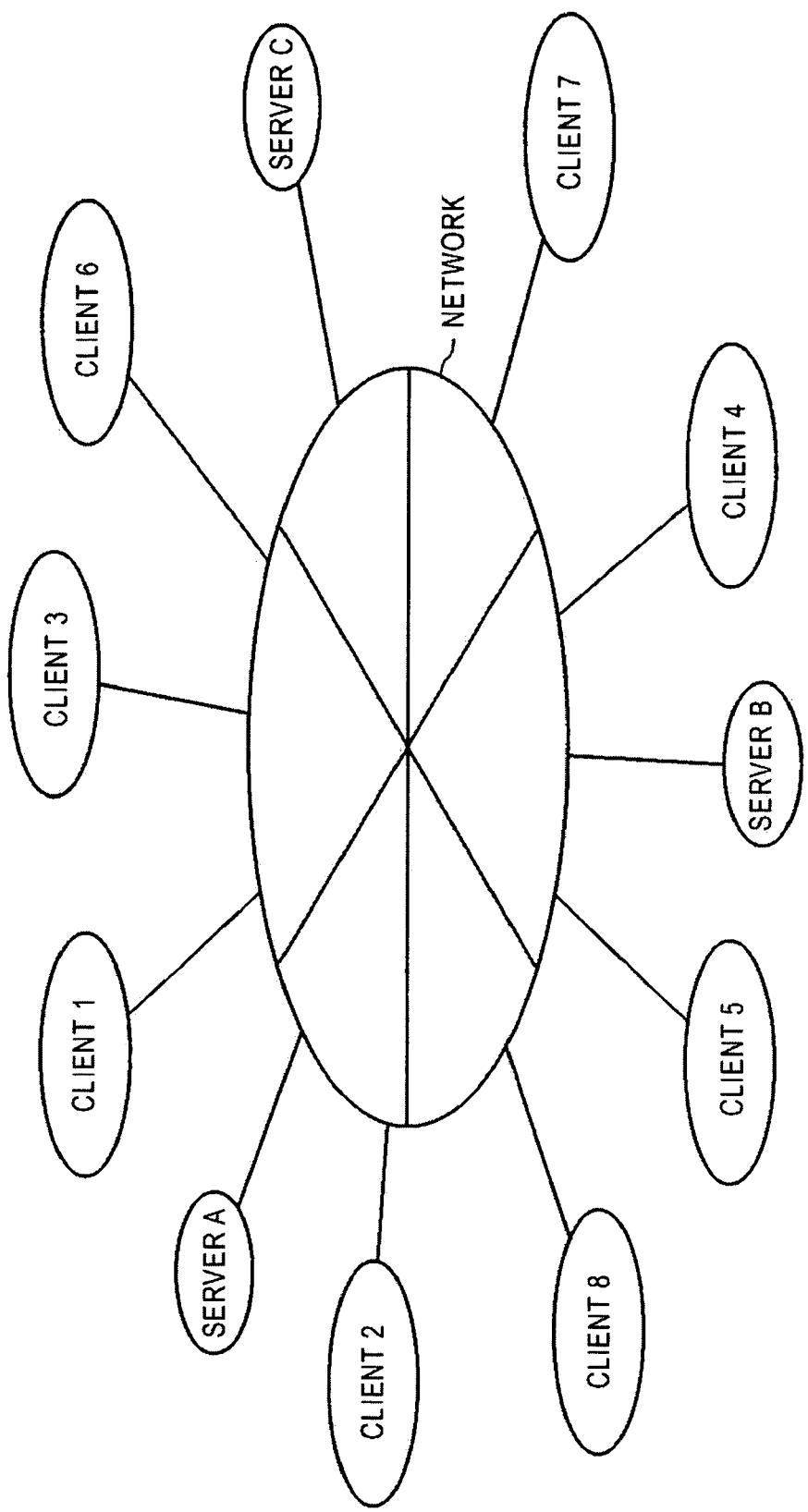
FIG. 1 is a diagram showing an example of a network system.

FIG. 1 shows an example of a network system to which the present invention can be applied. In this example, three servers A to C and eight clients 1 to 8 constitute a single segment of a network. Hereinafter, servers and clients may be collectively referred to as devices.

The devices A to C and 1 to 8 can perform communication with one another in the segment by multicast or broadcast based on the Transmission Control Protocol/Internet Protocol (referred to hereinafter as TCP/IP). The description below assumes that these devices perform communication by multicast. The devices A to C and 1 to 8 are also assumed to open a particular port to receive data by multicast.

Figure 2:
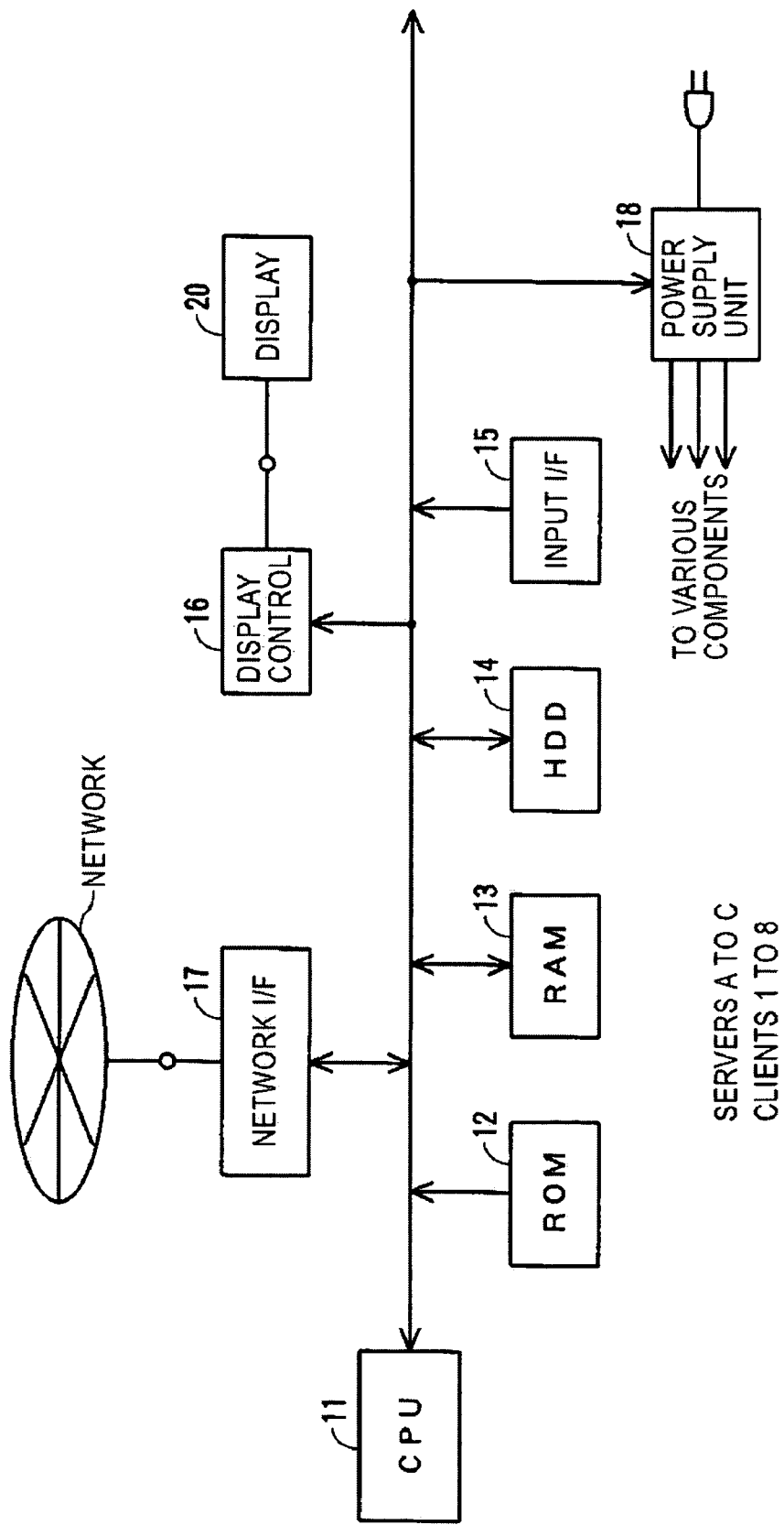
FIG. 2 a diagram showing an example structure of a server and a client.

FIG. 2 shows an example of each of the servers A to C and the clients 1 to 8. These devices A to C and 1 to 8 are constructed as with standard servers and clients. More specifically, each of the devices A to C and 1 to 8 includes a Central Processing Unit (referred to hereinafter as a CPU) 11 for executing a predetermined program, a Read Only Memory (referred to hereinafter as a ROM) 12 having, for example, a Basic Input/Output System (BIOS) written therein, a Random Access Memory (referred to hereinafter as a RAM) 13 for work area, and a Hard Disk Drive (referred to hereinafter as an HDD) 14 having various types of programs and data stored therein.

Furthermore, each of the devices A to C and 1 to 8 includes an input interface 15 such as a mouse and a keyboard, a display controller 16, a network interface 17, and a power supply unit 18. The display controller 16 has a display 20 connected thereto.

With this structure, when each of the devices A to C and 1 to 8 is powered on by operating the power switch or by means of the WOL function, necessary programs, such as an Operating System (referred to hereinafter as an OS) and applications, are loaded from the HDD 14 to the RAM 13 to bring the relevant device into operation. Thus, the devices each become available as a server or a client.

Once these devices A to C and 1 to 8 are brought into operation, they are interconnected via the respective network interfaces 17, thereby establishing the network shown in FIG. 1.

Figure 3:
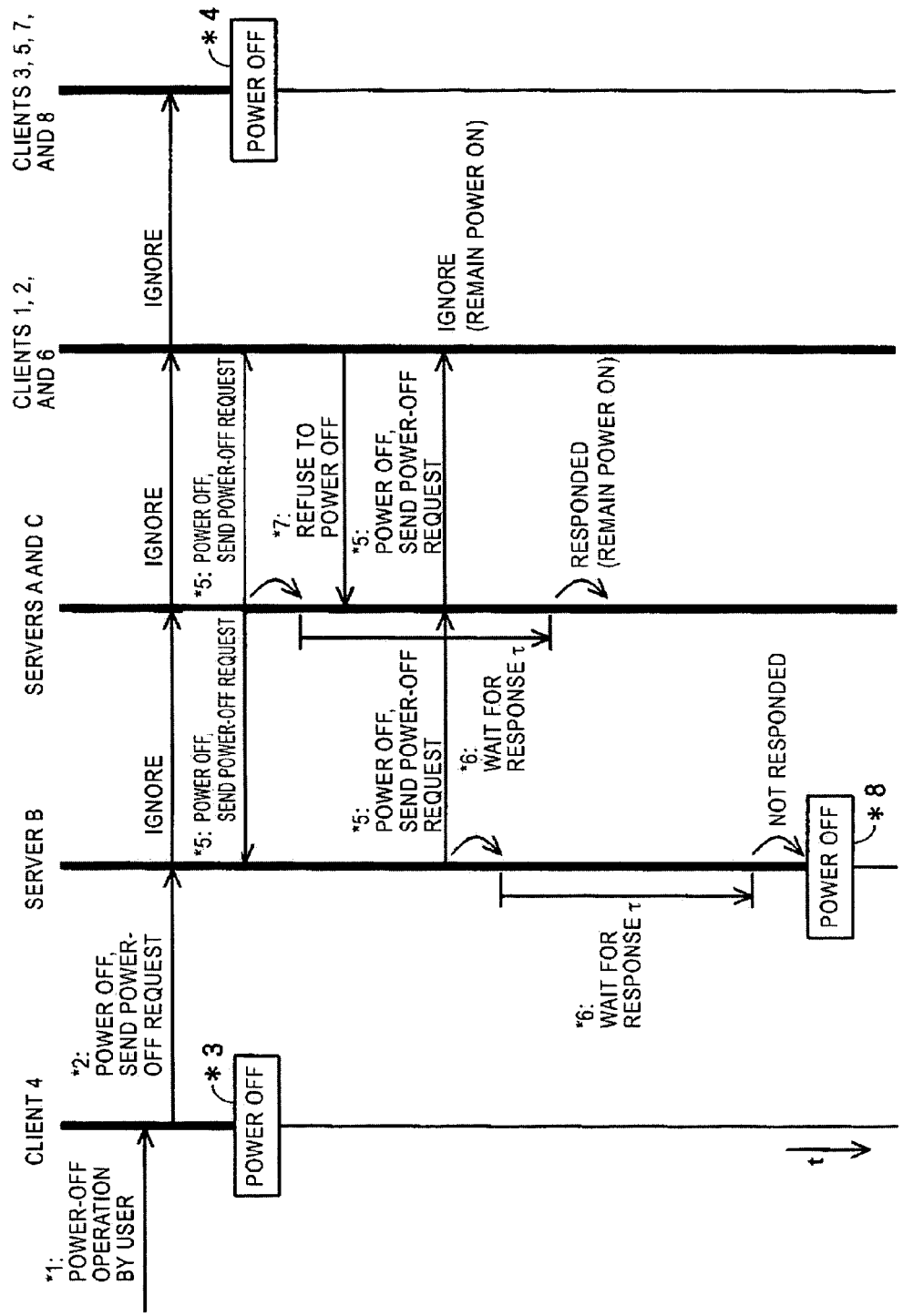
FIG. 3 is sequence diagram according to an embodiment of the present invention.
Figure 4:
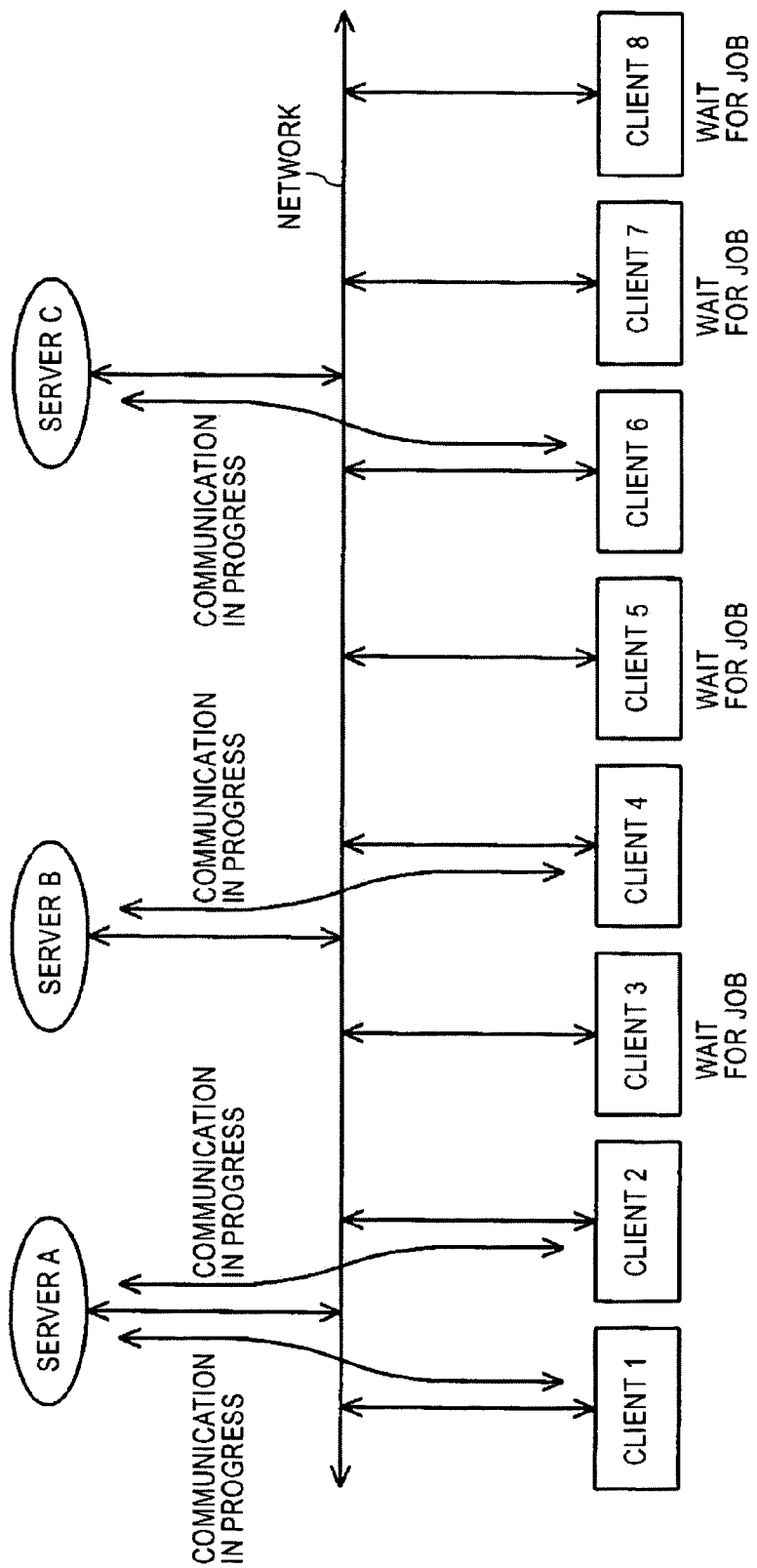
FIG. 4 is a diagram showing a process according to an embodiment of the present invention.

According to the present invention, when a client or a server is powered off, other devices are also powered off according to, for example, the sequence shown in FIG. 3. More specifically, let us assume that the clients 1 and 2 are in communication with the server A, the client 4 is in communication with the server B, and the client 6 is in communication with the server C, as shown in FIG. 4. Furthermore, let us assume that the other clients 3, 5, 7, and 8 are idle (have completed their jobs) but are in a power-on state.

Figure 5:
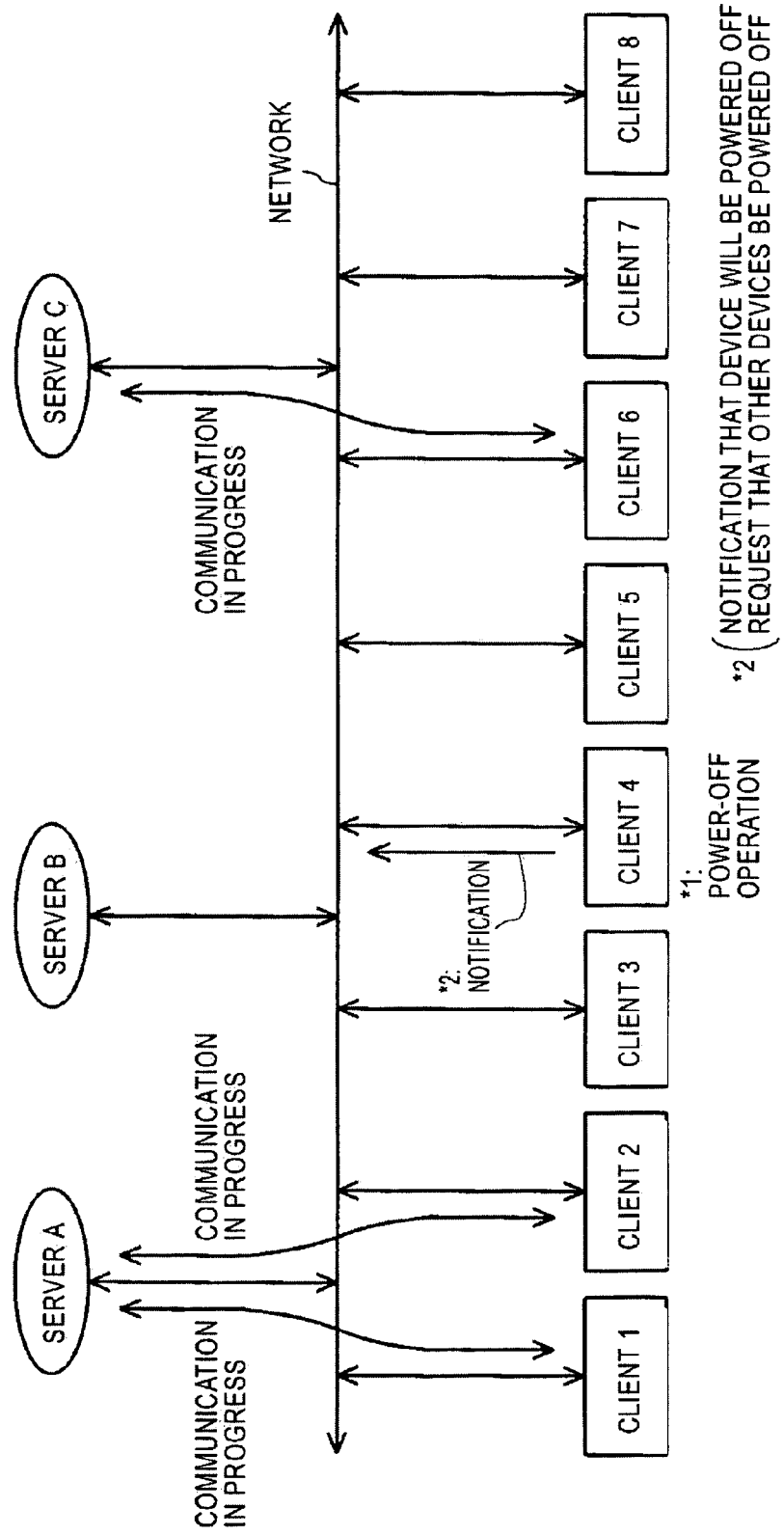
FIG. 5 is a diagram showing a process according to an embodiment of the present invention.

Under the conditions described above, a user's power-off operation of the client 4 (for example, because the user has completed a job with the server 4), as indicated by mark *1 in FIG. 3, triggers the following sequence of operations in the network. First, the client 4 multicasts to the other devices A to C, 1 to 3, and 5 to 8 a notification that the client 4 will be powered off and a request that the other clients that receive this notification should also be powered off, as indicated by mark *2 in FIGS. 3 and 5.

Figure 6:
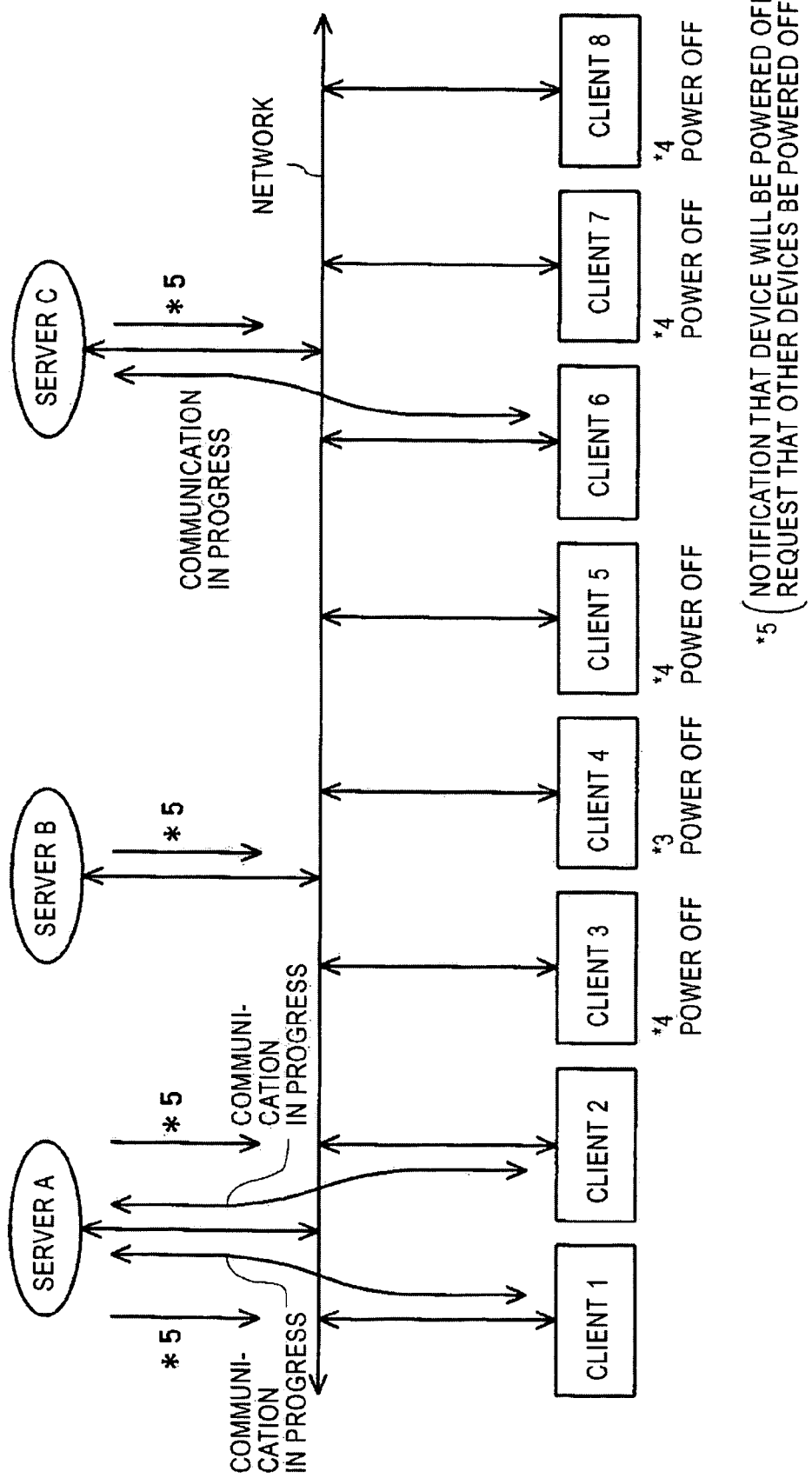
FIG. 6 is a diagram showing a process according to an embodiment of the present invention.

After a predetermined period of time has elapsed, the client 4 exits the OS and is powered off (i.e., waits until the subsequent power on), as indicated by mark *3 in FIGS. 3 and 6. Since this power-off processing of the client 4 is based on a user's intentional power-off operation (as indicated by mark *1), the client 4 can safely be powered off, as described above.

The sent notification indicated by mark *2 is received by the devices A to C, 1 to 3, and 5 to 8. Each of the clients 1 to 3 and 5 to 8 determines whether or not the power can be turned off according to the power-off request contained in the notification indicated by mark *2. More specifically, in this case, the clients 3, 5, 7, and 8 exit the OS and are powered off, as indicated by mark *4 in FIGS. 3 and 6, because the clients 3, 5, 7, and 8 are idle (have no jobs in progress). In contrast, the clients 1, 2, and 6, which are in communication with the server A or C, continue the communication without turning off the power.

In other words, when each of the clients receives the power-off request contained in the notification indicated by mark *2 from another client, each of the clients that has received the power-off request is powered off, as requested, only if a determination is made that shutdown processing will result in no problem. In spite of a power-off request being received from another client, the client that has received the power-off request ignores the power-off request if a determination is made that shutdown processing will result in a problem, for example, because the client is in communication with another device.

On the other hand, the notification indicated by mark *2 from the client 4 is also received by the servers A to C, each of which, in turn, sends the same notification indicated by mark *2 to other devices, as indicated by mark *5 in FIGS. 3 and 6. That is, the servers A to C multicast a notification that the servers A to C will be powered off and a request that the other clients which have received this notification should also be powered off. After the notification has been sent, the servers A to C wait for a response for a predetermined period of time τ, as indicated by mark *6 in FIG. 3.

At this time, as shown in FIG. 6, the clients 3, 5, 7, 8 are already in a power-off state according to the power-off request from the client 4. Furthermore, the client 4 is also in a power-off state.

When the power-off request indicated by mark *5 is sent from each of the servers A to C, the power-off request is received by the clients 1, 2, and 6. Here, since the clients 1 and 2 are in communication with the server A, the clients 1 and 2 unicast to the server A a response indicating a refusal to accept the power-off request (hereinafter, also referred to as a negative response) in the notification indicated by mark *5, as indicated by mark *7 in FIGS. 3 and 7.

Figure 7:
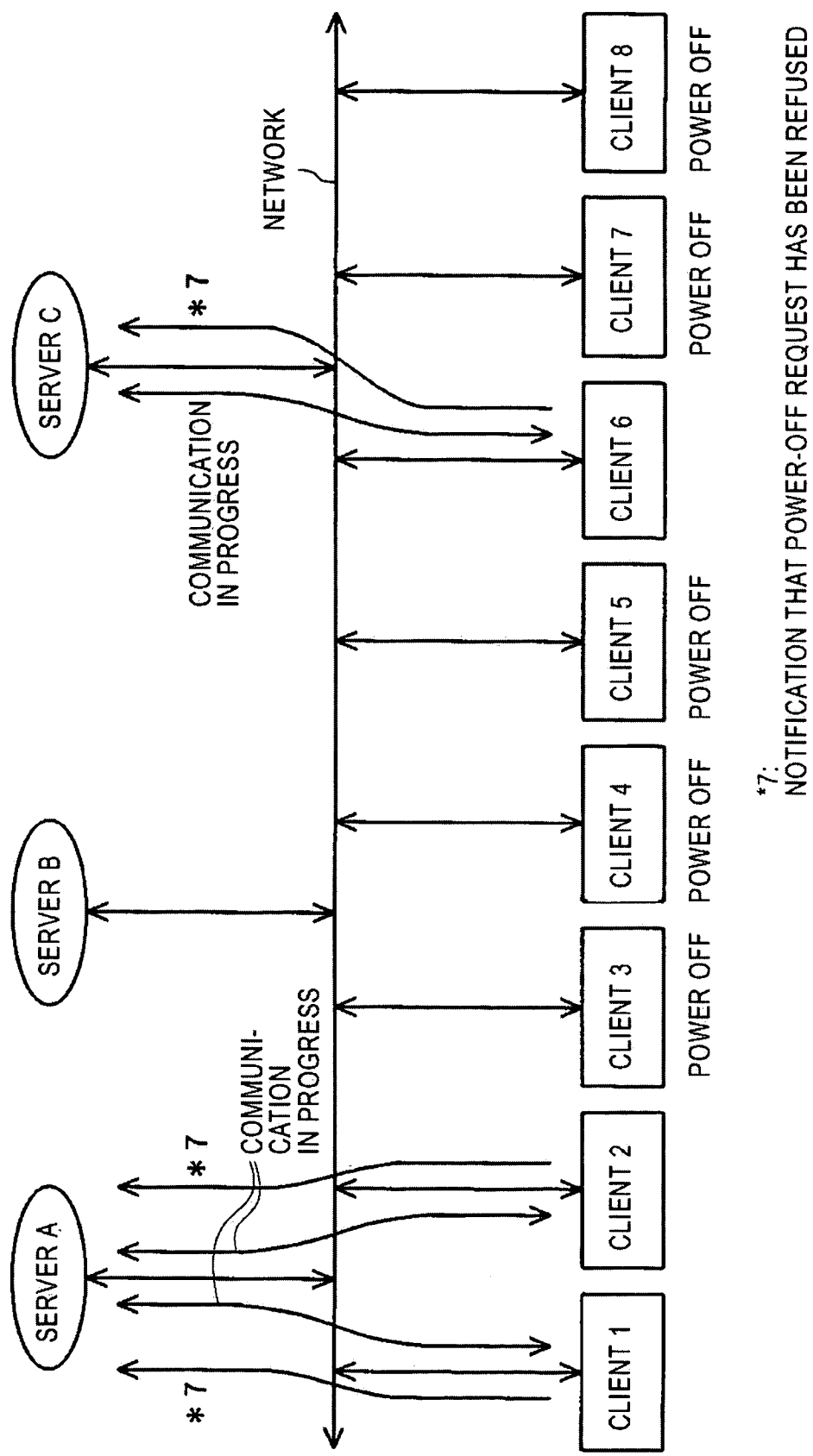
FIG. 7 is a diagram showing a process according to an embodiment of the present invention.

Furthermore, since the remaining client 6 is in communication with the server C, the client 6 unicasts to the server C a response indicating a refusal to accept the power-off request in the notification indicated by mark *5, as indicated by mark *7 in FIGS. 3 and 7. In contrast, since the server B is not in communication with any client, a notification indicating a refusal to accept the power-off request in the notification indicated by mark *5 is not sent to the server B.

Thus, the negative response indicated by mark *7 is received by each of the servers A and C which are in the response-wait period τ. As a result, the servers A and C remain powered on to continue communication. In contrast, since the server B does not receive a notification indicating a refusal to accept the power-off request in the notification indicated by mark *5, the server B exits the OS and is powered off, as indicated by mark *8 in FIGS. 3 and 8.

Figure 8:
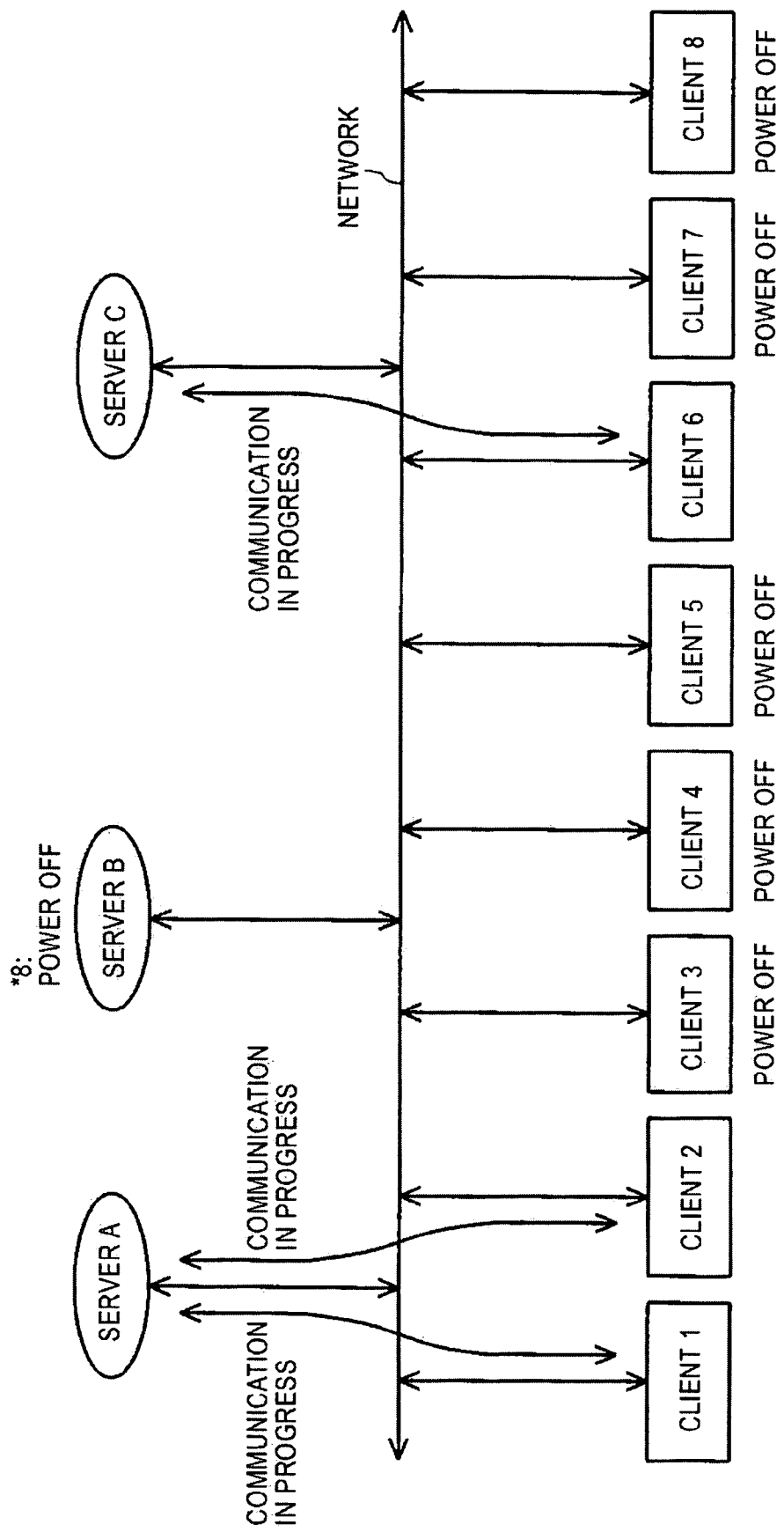
FIG. 8 is a diagram showing a process according to an embodiment of the present invention.

Thus, when the client 4 is powered off, the clients 3, 5, 7, 8 and the server B, which have no jobs in progress at this time, are also powered off in conjunction with the shutdown processing of the client 4, as shown in FIG. 8. Furthermore, in this case, the clients 1, 2, and 6 and the servers A and C remain powered on to continue communication.

In this manner, in the above-described network system, when a client on the network is powered off, other servers and clients connected to the same segment of the network can also be powered off in conjunction with the shutdown processing of the client. In addition, only servers and clients which have no jobs in progress can be powered off, i.e., servers and clients having a job in progress are not powered off. This prevents unintended shutdown of devices from occurring.

FIGS. 9 and 10 show a routine for realizing the above-described power-off sequence. This power-off routine is executed in the same manner among the servers A to C and the clients 1 to 8 by the CPU 11 in each of the servers A to C and the clients 1 to 8. Here, FIGS. 9 and 10 show only a portion of the routine that is associated with the present invention. Marks *1 to *8 in the routine correspond to marks *1 to *8 in FIGS. 3 to 8.

Referring to FIG. 9, when the user performs a power-off operation of, for example, the client 4 (operation indicated by mark *1), the CPU 11 of the client 4 carries out the processing of the routine starting with step S101 and then proceeds to step S102, where a determination is made as to whether or not multicasting is used as the communication scheme. Communication is based on multicasting in this example, and hence the processing proceeds from step S102 to step S103, where the client 4 multicasts to the other devices A to C, 1 to 3, and 5 to 8 a notification indicating that the client 4 will be powered off and that other clients which have received this notification should also be powered off (notification indicated by mark *2).

The processing then proceeds to step S104, where a determination is made as to whether or not the device itself (the client 4 in this case) is a client. Because the client 4 is a client, the processing proceeds from step S104 to step S105, where the client 4 determines whether or not the client 4 can be powered off.

In this case, since the client 4 is not in communication with any server, i.e., the client 4 can be powered off, the processing proceeds from step S105 to step S106, where the client 4 exits the OS and is powered off (processing indicated by mark *3).

On the other hand, the notification indicated by mark *2 sent in step S103 is received by the other devices A to C, 1 to 3, and 5 to 8. Referring to FIG. 10, in each of the devices A to C, 1 to 3, and 5 to 8, the processing by the CPU 11 starts from step S111 of the routine and then proceeds to step S112, where a determination is made as to whether or not the device including the relevant CPU 11 is a client.

When a determination is made that the device including the relevant CPU 11 is a client, i.e., when the device itself is one of the clients 1 to 3 and 5 to 8, the processing proceeds from step S112 to step S113, where a determination is made as to whether or not the device itself can be powered off.

In this case, since the clients 3, 5, 7, and 8 are not in communication with any servers, i.e., they can be powered off, the processing for the clients 3, 5, 7, and 8 proceeds from step S113 to step S114, where each of the clients 3, 5, 7, and 8 exits the OS and is powered off (processing indicated by mark *4).

Furthermore, since the clients 1, 2, and 6 are in communication with the server A or C, i.e., they cannot be powered off in step S113, the processing in the clients 1, 2, and 6 proceeds from step S113 to step S121. In this step S121, a determination is made as to whether or not the sender of the notification indicated by mark *2 that has caused the processing to start from step S111 is a communication partner of the device itself.

In this case, the notification indicated by mark *2 has been sent from the client 4, which is not a communication partner of the client 1, 2, or 6. Therefore, the processing proceeds from step S121 to step S123 to end the routine without turning off the power. Thus, the routine does not power off the clients 1, 2, and 6, which are in communication with another device. As a result, the clients 1, 2, and 6 can continue communication with the server A or C.

On the other hand, if a determination is made in step S112 that the device itself is a server, i.e., if the device itself is one of the servers A to C, the processing proceeds from step S112 to step S131, where a determination is made as to whether or not the device itself has sent a power-off request indicated by mark *5, as shown in FIG. 9. If the device itself has not yet sent a power-off request, the processing proceeds from step S131 to step S103 via step S102.

Thus, in step S103, as described above, each of the servers A to C multicasts to the other servers and the clients 1, 2, and 6 a notification that the servers A to C will be powered off and a request that the other clients that receive this notification should also be powered off (notification indicated by mark *5 in this case).

Since this notification indicated by mark *5 is received at the other devices A to C, 1, 2, and 6, the CPU 11 in each of these devices A to C, 1, 2, and 6 starts the processing from step S111 and proceeds to step S112, as described above.

As a result, in the clients 1, 2, and 6, the processing proceeds from step S112 to step S113, where, since the clients 1, 2, and 6 cannot be powered off in this case, the processing further proceeds to step S121. Then, the processing in the clients 1, 2, and 6 proceeds from step S121 to step S122 since a determination is made in step S121 that the received notification indicated by mark *5 has been sent from their respective communication partners. In this step S122, the clients 1, 2, and 6 unicast to the servers A and C the negative response (*7) to the power-off request, and then exit the routine in step S123.

Thus, the power-off request indicated by mark *5 received in step S111 is ignored by the clients 1, 2, and 6, which can thus continue the communication in progress.

Furthermore, if a determination is made in step S112 that the device itself is one of the servers A to C, the processing in the device proceeds from step S112 to step S131, where, since a power-off request has been sent as the notification indicated by mark *5, the processing proceeds from step S131 to step S104.

Then, since a determination is made in step S104 that each of the servers A to C is a server, the processing proceeds from step S104 to step S141, where the wait period τ is entered to receive the negative response (*7) to the power-off request (*6). After the response-wait period τ has elapsed, the processing proceeds to step S142, where a determination is made as to whether or not the negative response (*7) to the power-off request has been issued in the period τ.

Since the response indicated by mark *7 has not been received within the wait period τ in the server B, the processing of the server B proceeds from step S142 to step S106, where the server B exits the OS and is powered off (*8). In contrast, since the response indicated by mark *7 has been received within the wait period τ in the servers A and C, the processing of the servers A and C proceeds from step S142 to step S143, where the servers A and C exit the routine without turning off the power.

Thus, the routine causes the server B, which is not in communication with another device, to be powered off, and does not affect the client servers A and C, which are in communication with another device, so that the servers A to C can continue communication.

As described above, a user's power-off operation of, for example, the client 4 causes the processing in the client 4 to proceed in the order of step S101, step S102, step S103, step S104, and step S105. If a determination is made that the client 4 cannot be powered off, for example, because the client 4 is in communication with another device, the processing proceeds from step S105 to step S143, and thus the client 4 ignores the user's power-off operation.

Furthermore, if communication of the servers A to C and the clients 1 to 8 is not based on multicasting, the processing in step S102 proceeds to step S151, where a list of devices to which the power-off request is sent is generated. Subsequently, in step S152, the same notification indicated by mark *2 or *5 as in step S103 is unicasted to the devices included in the list generated in step S151, and then the processing proceeds to step S104.

As described above, according to the above-described routine, when a client on the network is powered off, other servers and clients connected to the same segment of the network can also be powered off in conjunction with the power-off processing of the client. In this case, only servers and clients which have completed their jobs are powered off, while servers and clients which are still doing jobs remain powered on. This prevents unintended shutdown of a device from occurring.

In addition, regardless of whether a power-off request is issued by a server or a client, power-off processing can be carried out appropriately, as described above. Furthermore, although this embodiment has been described assuming that a power-off request is multicasted, a power-off request can also be unicasted if each device is provided with a list containing the devices to which the power-off request is to be sent. In this case, the scope of application of the present invention is not limited to the same segment. In other words, extra-segment communication, such as power-off control of out-of-house devices from an in-house device, or vice versa, is possible.

Although this embodiment has been described by way of example where the communication protocol is TCP/IP, any protocols that allow a power-off request to be sent are acceptable. Although this embodiment has been described by way of example of a network system based on a client/server model, a network system based on a peer-to-peer model is also acceptable because one of two devices communicating with each other in a peer-to-peer model functions as a server and the other of the two devices functions as a client during communication, so that one device can be powered off in conjunction with the power-off processing of the other device. In conclusion, the present invention can be applied to any device that constitutes a network and has a function for sending a power-off request to another device.

What is claimed is:

1. A method for shutting down the power of a plurality of computers on a network, the method comprising the steps of:
   sending a power-off request from a first computer on the network to other computers on the network when the first computer is subjected to a power-off operation;
   executing processing for shutting down the power of the first computer after the power-off request is sent from the first computer;
   making a first determination as to whether or not a second computer on the network that has received the power-off request from a sending computer can be powered off;
   shutting down the power of the second computer if the first determination indicates that the second computer can be powered off or making a second determination as to whether the sending computer is a communication partner of the second computer if the first determination indicates that the second computer cannot be powered off;
   keeping the second computer powered on if the second determination indicates that the sending computer is not a communication partner of the second computer or sending a response indicating a refusal to accept the power-off request from the second computer to the sending computer if the second determination indicates that the sending computer is a communication partner of the second computer; and
   keeping the sending computer powered on if sending the computer receives a response indicating a refusal to accept the power-off request or shutting down the sending computer if the sending computer does not receive a response indicating a refusal to accept the power-off request.

2. The method according to claim 1, wherein the power-off request is multicasted or broadcasted and the response indicating a refusal to accept the power-off request is unicasted.

3. The method according to claim 1, wherein, in the power-off-request sending step, a list of computers on the network to which the power-off request is sent is generated and the power-off request is unicasted to the computers included in the list.

4. A server of a plurality of computers constituting a network, the server executing the steps of:
   ignoring a first power-off request when the first power-off request is sent to the server from a client on the network subjected to a shutdown operation and sending a second power-off request to another computer on the network;
   checking whether or not a response indicating a refusal to accept the second power-off request is returned from a client to the server after the second power-off request is sent; and
   shutting down the server if a check result in the checking step indicates that a response indicating a refusal to accept the second power-off request is not returned to the server or keeping the server powered on if a check result in the checking step indicates that a response indicating a refusal to accept the second power-off request is returned to the server.

5. A client of a plurality of computers constituting a network, the client comprising at least one computer-readable medium encoded with instructions for execution on a computer, wherein the instructions, when executed, perform a method comprising acts of:
   determining whether or not the client can be powered-off when a power-off request is sent from another computer on the network subjected to a shutdown operation; and
   shutting down the client if a result in the determining step indicates that the client can be powered off or, if a result in the first determining step indicates that the client cannot be powered off, keeping the client powered on, determining whether the other computer is a communication partner of the client, and sending a response indicating both a refusal to accept the power-off request and a determination as to whether the other computer is a communication partner of the client.

* * * * *